3,197,365
INSECTICIDAL AND NEMATOCIDAL PHOSPHINYL IMIDES
James Byron Lovell, Pennington, N.J., assignor to American Cyanamid Company, Stamford, Conn., a corporation of Maine
No Drawing. Filed Oct. 2, 1963, Ser. No. 313,199
13 Claims. (Cl. 167—33)

The present invention relates to novel insecticidal and nematocidal compositions. More particularly, it relates to the aforementioned compositions containing as their active ingredient phosphinyl imides.

This application is a continuation-in-part application of application for United States Letters Patent Serial No. 170,276, filed on January 31, 1962, now abandoned.

The phosphinyl imides incorporated into long-lasting systemic insecticidal as well as nematocidal compositions of the present invention, may be represented by the general formula:

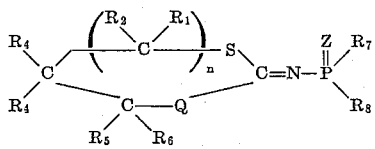

wherein $R_1$, $R_2$, $R_3$, $R_4$, $R_5$ and $R_6$ which may be the same or different, represent hydrogen, lower alkyl, halo (lower) alkyl, lower carbalkoxy, phenyl, naphthyl, a substituted phenyl or aralkyl; $R_7$ and $R_8$ which may be the same or different, represent lower alkyl, phenyl, lower alkoxy, alkylthio, or lower alkylamino radicals; Q and Z represent sulfur or oxygen atoms; and $n$ is an integer from 0 to 1.

It is known that insecticidal compounds kill through contact, stomach or fumigant activity. A smaller number of insecticides possesses highly desirable systemic activity. Such activity is defined as the absorption of the insecticidal compound through the foilage or the roots and the translocation through a plant thereby rendering the plant toxic to insects which feed on it. However, the effectiveness of known compounds is of relatively short duration and systemic control of all types of insects has not been achieved. Known systemics are particularly deficient in the control of chewing insects. If a composition could be developed to overcome the aforementioned objections, this would be highly desirable. Further, if the insecticidal compounds also possess nematocidal activity, the over-all utility of such compositions containing the same would be substantially enhanced.

It is, therefore, a principal object of the invention to provide insecticidal and nematocidal compositions containing certain phosphinyl imides. It is a further object of the invention to provide an insecticidal and nematocidal composition containing certain phosphinyl imides having long-lasting systemic activity against both sucking and chewing insects. It is a still further object to provide a nematocidal composition of outstanding activity. Other objects will become apparent to those skilled in the art from a consideration of the following detailed description.

To this end, certain novel phosphinyl imides have been found to exhibit outstanding long-lasting, systemic insecticidal and nematocidal properties. Surprisingly, they have been found effective against not only sucking insects which characterize some of the known systemic insecticides, but also these are unexpectedly effective against the chewing insects types.

In general, the compounds of the present invention may be conveniently synthesized by initially preparing the appropriate 2-imino derivative of the desired hetero sulfur moiety and, thereafter, effecting reaction between the latter hetero sulfur moiety and a phosphorus-containing compound, such as for instance an O,O-dialkylphosphorohalothioate, O,O-dialkylphosphorohaloate, O-alkyl alkanephosphonohalothioate, O-alkyl - N - monoalkylphosphoroamidohaloate, O - alkyl-N,N-dialkylphosphoroamidohalothioate, N,N'-dialkylphosphorodiamidohalothioate, O-alkylphenylphosphonohalothioate, O,O - diphenylphosphorohaloate, or the like.

The over-all reaction may be graphically written as:

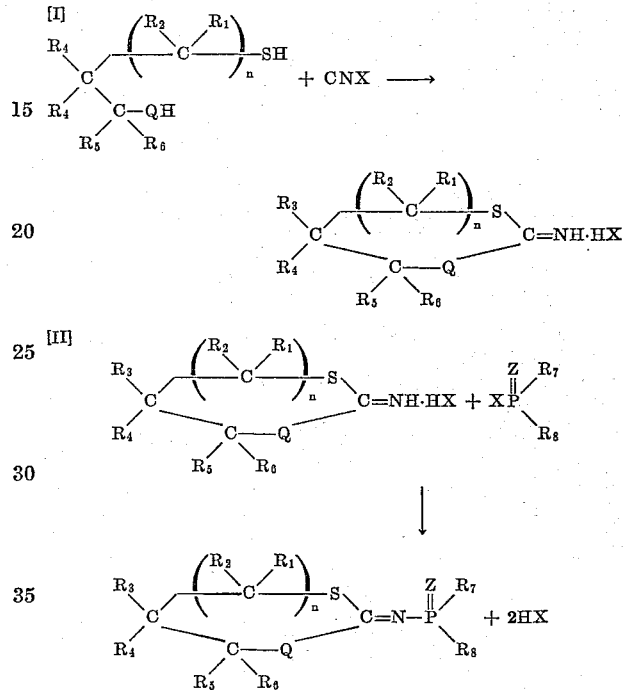

wherein Q and Z are each an atom of either oxygen or sulfur, $n$ is an integer from 0 to 1; X is halogen, such as fluorine, chlorine, bromine or iodine; $R_1$, $R_2$, $R_3$, $R_4$, $R_5$ and $R_6$ are hydrogen, lower alkyl from 1 to 7 carbon atoms, such as methyl, ethyl, n-propyl, isopropyl, t-butyl, sec. pentyl or n-hexyl, lower carbalkoxy, such as carbomethoxy or carbethoxy, carbamyl, N-methyl carbamyl, halogen, such as chlorine or bromine, cyano, acetoxyalkyl such as acetoxymethyl, methoxy, alkylthio, haloalkyl, such as chloromethyl or bromoethyl, an aryl substituent, such as phenyl, naphthyl, halogen-substituted phenyl, such as p-chlorophenyl, o-bromophenyl, or o,p-dichlorophenyl, lower alkyl-substituted phenyl, such as tolyl, xylyl, p-nitrophenyl, o-cyanophenyl, m-methoxyphenyl, p-methylthiophenyl, carbamylphenyl, N-methyl-carbamylphenyl, carbomethoxyphenyl, carboethoxyphenyl or sulfamylphenyl, aralkyl, such as benzyl or β-phenylethyl; $R_7$ and $R_8$ are lower alkyl radicals, such as methyl, ethyl, n-propyl, isopropyl, butyl, hexyl or heptyl, phenyl, lower alkoxy, such as methoxy, ethoxy or butoxy, lower alkylthio, such as methylthio or ethylthio, and lower alkyl amino radicals, such as methylamino, dimethylamino, ethylamino, diethylamino, di-n-propylamino or diisopropylamino.

The mono- or dithiol reactants employed in Equation I hereinabove include illustratively: ethane-1,2 - dithiol, 1-hydroxy-2-mercaptoethane, propane-1,2-dithiol, propane-1,3-dithiol, 1-mercapto-3-hydroxypropane, 2-methylpropane-1,3-dithiol, n-butane-1,2-dithiol, 2-ethylpropane-1,3-dithiol, 2,5-dimethylhexane-3,4-dithiol, phenylethane-1,2-dithiol, o-cyanophenylethane-1,2-dithiol, o-tolylethane-1,2-dithiol, 3-phenylpropane-1,2-dithiol, p-nitrophenylethane-1,2-dithiol, o-methoxyphenylethane-1,2-dithiol, o-carbethoxyphenylethane-1,2-dithiol, p-sulfamylphenylethane-1,2-dithiol, m-carbamylphenylethane-1,2-dithiol, o-carbamylphenyl-2-mercaptoethanol, 2-p-ethylthiophenylpropane-1,3-dithiol, p-acetylphenylethane-1,2-dithiol, o-thiocyanoethane-1,2-dithiol, 3-chloropropane-1,2-dithiol, carbomethoxyethane-1,2-dithiol, α-naphthylethane-1,2-dithiol, β-naphthylethane-1,2-dithiol, 1-α-naphthylpropane-1,3-dithiol, 1-β-naphthylpropane-1,3-dithiol, 2-α-naphthylpropane-1,3-dithiol, 2-β-naphthylpropane-1,3-dithiol, homologs and isomers of the aforementioned thiols.

The cyanogen halide reactant employed in the process of the invention is preferably cyanogen chloride. However, cyanogen bromide, cyanogen iodide, cyanogen fluoride, or mixtures thereof, may also be employed advantageously.

It has been found that, where a dithiol reactant is employed in Equation I above, the rate of reaction and yield of resultant 2-imino dithioheterocyclic moiety is markedly increased when utilizing an acidified alcoholic catalyst during reaction. Where a mercaptoalcohol, such as mercaptoethanol, is employed as the reactant in Equation I above, the aforementioned monohydric aliphatic alcohol can be conveniently omitted from the catalyst mixture so that the rate of reaction and yield are increased by using the acid catalyst alone.

Illustrative catalysts include: dry hydrogen chloride, dry hydrogen bromide, boron trifluoride, aluminum chloride and p-toluene sulfonic acid in combination with a monohydric aliphatic alcohol of from one to four carbon atoms, such as methanol, ethanol, isopropyl alcohol, n-butanol, t-butanol, or the like. In general, from 0.1% to 5% each of the aforementioned acid and alcohol by weight, based on the weight of the thiol reactant, is utilized for optimum results. It has been further found that a good practice for realizing ready recovery of the imino intermediate prepared by reacting a thiol and cyanogen halide is to carry out the acid-alcoholic catalyzed reaction in a non-aqueous, inert solvent, as for instance, toluene, chloroform or ethylene glycol dimethyl ether.

In general, typical phosphorohalothioates or the phosphorohaloate reactants employed in Equation II above are:

O,O-dimethyl phosphorochloridothioate,
O,O-diethyl phosphorochloridothioate,
O-methyl, O-ethyl phosphorochloridothioate,
O,O-di-isopropyl phosphorobromidothioate,
O,O-di-n-butyl phosphorochloridothioate,
O,O-di-sec.-pentyl phosphoroiodothioate,
O,O-dimethyl phosphorochloridate,
O,O-diethyl phosphorochloridate,
O-ethyl ethane phosphonochloridothioate,
O-ethyl-N,N-dimethyl phosphoramidochloridothioate,
O-ethyl, phenylphosphonochloridothioate,
O-ethyl-N-isopropyl phosphoramidochloridothioate,
O-ethyl-N-methyl phosphoramidochloridothioate,
Diethylphosphorochloridotrithioate, and
Diethylphosphinothioyl bromide.

It has been found that both illustrated reactions may be carried out in sequence without separation of the several reaction products, or they may be carried out stepwise. Advantageously, the reaction represented by Equation II is carried out in the presence of an acid acceptor, which may be either an organic or inorganic base. Contemplated, for example, are: sodium hydroxide, potassium hydroxide, lithium bicarbonate, sodium bicarbonate, triethyl amine and sodium acetate. Base, sufficient to neutralize the imino hydrohalide and the acid formed during reaction, is provided for optimum results.

To facilitate a further understanding of the present invention, the following illustrative examples are presented. These are not to be taken as limitative of the invention. Unless otherwise stated, the parts are by weight and the analyses are in percent.

EXAMPLE 1

*Preparation of 2-imino-1,3-dithiolane hydrochloride*

Into a mixture of 210 parts of toluene and 2.0 parts of ethanol in a suitable three-neck flask equipped with a stirrer, ice-water cooled condenser, thermometer and gas inlet tube is introduced hydrogen chloride as a gas for six minutes at a moderate rate. Titration of a 5.0 part aliquot of the toluene mixture in a homogeneous methanol-water mixture shows the hydrogen chloride concentration to be 0.12 molar. Ethane-1,2-dithiol (108.6 parts) is then added. The gas inlet tube is raised above the liquid surface and gaseous cyanogen chloride addition is begun from a tared cylinder. The rate of addition is 0.37 part per minute and solid product begins to appear after about twenty-five minutes. The initial reaction temperature is 21° C. and rises spontaneously to 50° C. after eighty minutes.

A room temperature water bath is placed in contact with the reaction flask so that the heat of reaction is controlled and is further maintained at between about 40° C. and 50° C. Over a period of three and one-half hours, 76 parts of cyanogen chloride are added. After removal of the cooling bath and an additional forty-two minute reaction period, infrared examination of the toluene mixture shows that less than about five percent of ethane-1,2-dithiol can be detected. To insure that the reaction has gone to completion, the reaction slurry is left undisturbed for an additional forty-five minutes. Then, the thick slurry is diluted with toluene and poured into a Buchner funnel. The solids are successively washed with additional portions of toluene and petroleum ether, respectively. After vacuum-drying, 179.3 parts of finely divided 2-imino-1,3-dithiolane hydrochloride, having a melting point of 212° C.–216° C. with decomposition, are obtained. The yield corresponds to 91.2% of theory based on ethane-1,2-dithiol.

In the foregoing example, similar results are obtained where cyanogen bromide is substituted for cyanogen chloride.

EXAMPLE 2

This example illustrates the effect of modifying the catalyst by omitting the alcohol.

Example 1 is repeated in every material detail, except that a total of 41 parts of cyanogen chloride is slowly added over a period of four hours to a mixture of 95.0 parts of ethane-1,2-dithiol and 200 parts of anhydrous toluene containing solely hydrogen chloride at a concentration of 0.22 molar. At the termination of an additional twenty-four hours, the reaction mixture is examined by infrared spectrum. The presence of substantial quantities of cyanogen chloride is detected indicating that, even after more than twenty-four hours, the reaction has not gone to completion.

Upon recovery of 2-imino-1,3-diethiolane hydrochloride as in Example 1, there are obtained 43.9 parts or 42.2%, based on added cyanogen chloride.

EXAMPLE 3

*Preparation of 2-imino-1,3-oxathiolane hydrochloride*

Into a mixture of 300 parts of chloroform in the apparatus described in Example 1 above, is passed dry hydrogen chloride for several minutes. Titration of an aliquot of the chloroform mixture shows the hydrogen chloride concentration to be 0.36 molar. After adding 89.4 parts of 1-hydroxy-2-mercaptoethane, 83.5 parts of gaseous cyanogen chloride are then passed into the mixture over a two and one-half hour period. The reaction temperature during this period is maintained at about 40° C. by external cooling of the three-necked flask. After an hour at room temperature, all the solids formed are collected on a Buchner funnel and washed with chloroform. Resultant dry, colorless 2-imino-1,3-oxathiolane hydrochloride is weighed and there are obtained 97.7 parts, or 60.6% of theory.

EXAMPLE 4

*Preparation of 2-imino-5-methyl-1,3-oxathiolane hydrochloride*

To 200 parts of reagent grade toluene partially saturated with dry hydrogen chloride are added 104.3 parts of 1-mercapto-2-hydroxypropane. Gaseous cyanogen chloride (74.8 parts) is added over a four hour period while the exothermic reaction which occurs is maintained at 30° C.–35° C. by cooling with a water bath. Stirring is contined for an additional hour and the crystalline iminohydrochloride is collected on a Buchner funnel, washed with ether and dried. The product weighs 149.8 parts which is 86.1% of theory, based on the mercaptopropanol used.

The infrared absorption curve is identical to that for a sample of 2-imino-5-methyl-2,-3-oxathiolane hydrochloride prepared by known methods from a propylene oxide and hydrothiocyanic acid.

EXAMPLE 5

*Preparation of 2-imino-4-methyl-1,3-dithiolane hydrochloride*

Employing the apparatus of Example 1 above, dry hydrogen chloride is passed rapidly into a mixture of 25 parts of chloroform and 0.2 part of ethanol for ten minutes. After addition of 7.8 parts of propane-1,2-dithiol, 5.3 parts of cyanogen chloride are introduced over an eighty minute period. The solids which form are collected and amount to 10.9 parts or 89% of theory of 2-imino-4-methyl-1,3-dithiolane hydrochloride. When the latter is recrystallized from ethanol, it melts at 166° C.–170° C. with decomposition.

Analysis for $C_4H_8ClNS_2$—Calculated: C, 28.31; H, 4.75. Found: C, 28.15; H, 4.95.

EXAMPLE 6

*Preparation of 2-imino-1,3-dithiane hydrochloride*

To a mixture of 130 parts of chloroform and 1.3 parts of ethanol nearly saturated with dry hydrogen chloride in a flask equipped with a stirrer, ice-water cooled condenser, gas inlet tube and thermometer are added 27.7 parts of propane-1,3-dithiol. Subsequent slow addition of gaseous cyanogen chloride over a two hour period causes a spontaneous temperature rise to 42° C. A total of 18 parts of cyanogen chloride is metered into a flask. After completion of cyanogen chloride addition, the mixture is heated at 50° C.–55° C. for one hour. The crystalline product amounts to 24.1 parts or 55.5% of theory. The sample is sublimed at 95° C.–100° C./0.005 mm. Hg for analysis. It melts with darkening at 155° C.–160° C.

Analysis for $C_4H_8ClNS_2$—Calculated: C, 28.31; H, 4.75; Cl, 20.89. Found: C, 27.99; H, 5.18; Cl, 20.89.

EXAMPLE 7

*Preparation of 2-imino-4-phenyl-1,3-dithiolane hydrochloride*

Dry hydrogen chloride is passed rapidly into a mixture of 40 parts of chloroform and 0.4 part of ethanol for ten minutes. After addition of 20.8 parts of phenyl-ethane-1,2-dithiol, 8.7 parts of cyanogen chloride are added over an eighty minute period. The solids which form amount to 25.7 parts or 90.5% of theory of 2-imino-4-phenyl-1,3-dithiolane hydrochloride. A vacuum sublimed sample melts at 195° C.–200° C. with decomposition.

Analysis for $C_9H_{10}ClNS_2$—Calculated: C, 46.63; H, 4.35; Cl, 15.30; N, 6.04; S, 27.67. Found: C, 46.71; H, 4.32; Cl, 15.03; N, 6.02; S, 27.93.

EXAMPLE 8

*Preparation of 2-dimethoxyphosphinothioylimino-1,3-dithiolane*

To a stirred mixture of 42.0 parts of 2-imino-1,3-dithiolane hydrochloride and 43.3 parts of O,O-dimethyl- phosphorochloridothioate in 400 parts of dry acetone are slowly added 54.5 parts of dry triethylamine. The addition rate is maintained so that the spontaneous temperature rise does not exceed 35° C. When the addition is completed, the temperature is maintained at 35° C. for two hours. Triethylamine hydrochloride is collected and the acetone stripped from the mother liquor. Resultant concentrate is diluted with chloroform and the mixture is then washed with dilute sodium bicarbonate solution, dilute hydrochloric acid, water, saturated salt solution and is filtered through magnesium sulfate. Stripping off the solvent in an evaporator yields 44.2 parts, or 70.1% of theory, of the iminophosphate. The latter is further purified by molecular distillation.

Analysis for $C_5H_{10}NO_2PS_3$—Calculated: C, 24.68; H, 4.14; P, 12.73; S, 39.54. Found: C, 24.68; H, 4.45; P, 12.54; S, 39.26.

EXAMPLE 9

Example 8 is repeated in every detail, except that potassium carbonate is substituted for triethylamine. Corresponding 2-dimethoxyphosphinothioylimino-1,3-dithiolane compound is recovered in a good yield.

EXAMPLE 10

*Preparation of 2-dimethoxyphosphinothioylimino-4-methyl-1,3-dithiolane*

The procedure of Example 8 is followed in every detail, except that 2-imino-4-methyl-1,3-dithiolane hydrochloride is reacted in lieu of 2-imino-1,3-dithiolane hydrochloride. Resultant oily product obtained in good yield is purified by dissolving it in ether and reprecipitating the desired product by addition of petroleum ether. The infrared absorption spectrum is that expected for the product showing a strong >C=N— band at 1550 cm.$^{-1}$.

EXAMPLE 11

Following the procedure of Example 8 in every detail, except that for the 2-imino-1,3-dithiolane hydrochloride reactant, 2 - imino-4-p-carbamylphenyl - 1,3 - dithiolane hydrochloride is substituted, resultant oily product, 2-dimethoxyphosphinothioylimino - 4 - p - carbamylphenyl-1,3-dithiolane, shows a strong >C=N— band at 1552 cm.$^{-1}$ by means of infrared analysis.

EXAMPLE 12

*Preparation of 2-dimethoxyphosphinyl-imino-1,3-dithiolane*

To a mixture of 39.8 parts of O,O-dimethyl phosphorochloridate and 42.8 parts of 2-imino-1,3-dithiolate hydrochloride in 250 parts of dry benzene are added over a ninety-minute period 76 parts (by volume) of triethylamine in 85 parts of benzene. After an additional three hours, triethylamine hydrochloride is collected and the filtrate is concentrated under vacuum. The concentrate is purified by molecular distillation at 0.001 mm. Hg between 100° C. and 105° C. to yield a product having both refractive index $(n_D^{25})$ equal to 1.5683 at 25° C. and a strong >C=N— band in the infrared spectrum at 1560 cm.$^{-1}$.

Analysis for $C_5H_{10}NO_3PS_2$—Calculated: C, 26.42; H, 4.44; S, 28.22; P, 13.63. Found: C, 26.59; H, 4.73; S, 28.26; P, 13.88.

Substituting 2 - imino-4-methyl - 1,3 - dithiolane hydrochloride for the dithiolane reactant above, the 2-dimethoxyphosphinylimino - 1,3-dithiolane derivative is obtained in good yield.

EXAMPLE 13

*Preparation of 2-diethoxyphosphinothioylimino-1,3-dithiolane*

To a stirred mixture of 44.0 parts of 2-imino-1,3-dithiolane hydrochloride and 53.4 parts of O,O,-diethyl phosphorochloridothioate in 100 parts of water and 200 parts of benzene are added 51.0 parts of sodium acetate in 100 parts of water over a thirty-minute period. After stirring for sixty hours, the benzene layer is separated and the water layer extracted once with ether. The combined ether-benzene mixture is washed with dilute sodium carbonate solution, then with water and dried. The solvent and some unreacted chloridothioate are stripped off under reduced pressure in a film-type evaporator. On standing, the product crystallizes. Washing off the solids with petroluem ether (30° C.–60° C.) yields 40.6 parts, or 56.3% of theory, of the iminophosphate having a melting point of 36.5° C.–38.8° C. A molecularly distilled sample analyzes as follows:

Analysis for $C_7H_{14}NO_2PS_3$—Calculated: C, 30.98; H, 5.20; P, 11.41; S, 35.54. Found: C, 30.80; H, 4.99; P, 11.66; S, 35.67.

EXAMPLE 14

*Preparation of 2-diethoxyphosphinothioylimino-imino-1,3-dithiolane*

Following the procedure of Example 13 in every detail, except that O-ethyl-O-methyl phosphorochloridothioate is substituted for the O,O-diethylphosphorochloridothioate reactant, the product. O-ethoxy-O-methoxyphosphinothioylimino-1,3-dithiolane, is obtained in good yield having a refractive index ($n_D^{25}$) equal to 1.6080 and analyzes for $C_6H_{12}NO_2PS_3$ as follows:

Calculated: C, 28.00; H, 4.70; N, 5.44; P, 12.04; S, 37.37. Found: C, 27.86; H, 4.73; N, 5.42; P, 12.14; S, 37.54.

EXAMPLE 15

*Preparation of 2-diethoxyphosphinothioylimino-4-α-naphthyl-1,3-dithiolane*

Following the procedure of Example 13 in every detail, except that 2-imino-4-α-naphthyl-1,3-dithiolane hydrochloride is substituted for the 2-imino-1,3-dithiolane hydrochloride reactant of that example, resultant product, 2-diethoxyphosphinothioylimino - 4-α-naphthyl-1,3-dithiolane, is recovered in good yield having a characteristic strong >C=N— absorption band in the infrared spectrum at 1562 cm.$^{-1}$.

EXAMPLE 16

*Preparation of 2-diethoxyphosphinothioylimino-4-benzyl-1,3-dithiolane*

Following the procedure of Example 13 in every detail, except that 2-imino-4-benzyl-1,3-dithiolane hydrochloride is substituted for the 2-imino-1,3-dithiolane reactant of that example, 2-diethoxyphosphinothioylimino-4-benzyl-1,3-dithiolane is obtained in good yield and has a refractive index ($n_D^{25}$) equal to 1.6066. The product analyzes as—Calculated: C, 46.51; H, 5.58; N, 3.88; P, 8.59; S, 26.61. Found: C, 46.52; H, 5.56; N, 4.06; P, 8.86; S, 26.80.

EXAMPLE 17

*Preparation of 2-diethoxyphosphinothioylimino-4-n-butyl-1,3-dithiolane*

The procedure of Example 13 is repeated in every detail, except that 2-imino-4-n-butyl-1,3-dithiolane hydrochloride is substituted for the 2-imino-1,3-ditholane hydrochloride reactant. Resultant product, 2-diethoxyphosphinothioylimino-4-n-butyl-1,3-dithiolane is obtained in good yield having a refractive index ($n_D^{25}$) equal to 1.5629 and analyzes as—

Calculated: C, 40.34; H, 6.77; N, 4.28; P, 9.46; S, 29.38. Found: C, 40.19; H, 6.72; N, 4.22; P, 9.68; S, 29.30.

EXAMPLE 18

*Preparation of 2-diethoxyphosphinothioylimino-4-carbmethoxy-1,3-dithiolane*

Example 13 above is repeated in every detail, except that 2-imino-4-carbmethoxy-1,3-dithiolane hydrochloride is substituted for the 2-imino-1,3-dithiolane hydrochloride. The 2-diethoxyphosphinothioylimino-4-carbmethoxy-1,3-dithiolane thus obtained in good yield has a refractive index ($n_D^{25}$) equal to 1.5767 and analyzes as—

Calculated: C, 32.81; H, 4.90; N, 4.25; S, 29.20; P, 9.40. Found: C, 32.82; H, 4.90; N, 4.32; S, 29.14; P, 9.20.

EXAMPLE 19

*Preparation of 2-diethoxyphosphinothioylimino-4-chloromethyl-1,3-dithiolane*

Example 13 is repeated in every detail, except that 2-imino-4-chloromethyl-1,3-dithiolane hydrochloride is employed in lieu of 2-imino-1,3-dithiolane hydrochloride. The 2-diethoxyphosphinothioylimino-4-chloromethyl-1,3-ditholane formed has a refractive index ($n_D^{25}$) equal to 1.5948 and analyzes as follows—

Calculated: C, 30.04; H, 4.73; Cl, 11.09; S, 30.08. Found: C, 29.98; H, 4.70; Cl, 10.92; S, 30.01.

EXAMPLE 20

*Preparation of 2-diethoxyphosphinothioylimino-4,4-dimethyl-1,3-dithiolane*

Following the procedure of Example 13 in every detail, except that 2-imino-4,4-dimethyl-1,3-dithiolane hydrochloride is employed in lieu of the dithiolane hydrochloride of Example 13, a good yield of 2-diethoxyphosphinothioylimino-4,4-dimethyl-1,3-dithiolane, having a refractive index ($n_D^{25}$) equal to 1.5724 is obtained which analyzes as follows—

Calculated: C, 36.10; H, 6.06; N, 4.68; P, 10.35; S, 32.13. Found: C, 35.90; H, 5.96; N, 4.90; P, 10.39; S, 31.95.

EXAMPLE 21

*Preparation of 2-diethoxyphosphinothioylimino-4,5-dimethyl-1,3-dithiolane*

Example 20 is repeated in every detail, except that 2-imino-4,5-dimethyl-1,3-dithiolane hydrochloride is substituted for 2-imino-4,4-dimethyl-1,3 - dithiolane hydrochloride. Resultant 2-diethoxyphosphinothioylimino-4,5-dimethyl-1,3-dithiolane, having a refractive index ($n_D^{25}$) equal to 1.5739, is recovered in good yield and analyzes as—

Calculated: C, 36.10; H, 6.06; N, 4.68; P, 10.35; S, 32.13. Found: C, 36.03; H, 6.45; N, 4.66, P, 10.51; S, 32.17.

EXAMPLE 22

*Preparation of 2-diethoxyphosphinothioylimino-1,3-oxathiolane*

To a stirred mixture of 10.6 parts of 2-imino-1,3-oxathiolane hydrochloride and 15.8 parts of O,O-diethylphosphorochloridothioate in 100 parts of dry acetone are added 25.6 parts (by volume) of an acid acceptor, dry ethylamine, over a thirty-minute period. The temperature rises to 35° C. during addition and is maintained at 40° C. for an additional three hours. After collecting the triethylamine hydrochloride, the acetone is stripped off and the concentrate is diluted with ether. The mixture is washed with dilute hydrochloric acid, then with water and dried. The latter is concentrated employing a thin-film evaporator. A yield of 13.0 parts, or 67.0% of theory, of the desired iminophosphate is obtained. The sample is molecularly distilled at 100° C. (20μ).

Analysis for $C_2H_{14}NO_2PS_2$—Calculated: C, 32.93; H, 5.53; P, 12.13; S, 25.12. Found: C, 33.05; H, 5.76; P, 12.20; S, 25.05.

EXAMPLE 23

*Preparation of 2-diethoxyphosphinothioylimino-5-o-methylphenyl-1,3-oxathiolane*

Following the procedure of Example 22 in every detail, except that 2-imino - 5 - o - methylphenyl-1,3-oxathiolane hydrochloride is substituted for the 2-imino-1,3-oxathiolane hydrochloride, resultant oily product, 2 - diethoxyphosphinothioylimino - 5 - o - methylphenyl-1,3-oxathiolane, is recovered in good yield having an infrared absorption spectrum showing a strong >C=N— band at 1555 cm.$^{-1}$.

EXAMPLE 24

*Preparation of 2-dimethoxyphosphinothioylimino-5-m-nitrophenyl-1,3-oxathiolane*

The procedure of Example 22 is repeated in every detail, except that for the 2-imino-1,3-oxathiolane hydrochloride and O,O-diethylphosphorochloridothioate reactants 2-imino-5-m-nitrophenyl-1,3-oxathiolane hydrochloride and O,O-dimethylphosphorochloridothioate are substituted. The resultant product, 2-dimethoxyphosphinothioylimino - 5 - m - nitrophenyl-1,3-oxathiolane, is an oil which shows by means of infrared absorption spectrum a strong >C=N— absorption band at 1562 cm.$^{-1}$.

EXAMPLE 25

*Preparation of 2-diethoxyphosphinylimino-1,3-oxathiolane*

Repeating the procedure of Example 12 in every detail, except that O,O-diethylphosphorochloridate and 2-imino-1,3-oxathiolane are substituted for the O,O-dimethylphosphorochloridate and 2-imino-1,3-dithiolane, respectively, resultant product, 2-diethoxyphosphinylimino-1,3-oxathiolane is recovered in good yield having a refractive index ($n_D^{25}$) equal to 1.4892 and analyzes as follows—

Calculated: C, 35.14; H, 5.90; N, 5.85; P, 12.95; S, 13.40. Found: C, 34.80; H, 5.81; N, 5.69; P, 12.62; S, 13.10.

EXAMPLE 26

*Preparation of 2-diethoxyphosphinothioylimino-4-methyl-1,3-oxathiolane*

The procedure of Example 22 is followed in every detail, except that for the 2-imino-1,3-oxathiolane reactant of that example, 2-imino-4-methyl-1,3-oxathiolane hydrochloride is substituted and 2-diethoxyphosphinothioylimino-4-methyl-1,3-oxathiolane is recovered in good yield. It possesses a refractive index ($n_D^{25}$) equal to 1.5396 and analyzes as—

Calculated: C, 35.68; H, 6.09; N, 5.20; P, 11.50; S, 23.81. Found: C, 35.83; H, 5.94; N, 5.27; P, 11.48; S, 24.05.

EXAMPLE 27

*Preparation of 2-diethoxyphosphinothioylimino-1,3-dithiane*

A mixture of 3.2 parts of 2-imino-1,3-dithiane hydrochloride, 4.0 parts of O,O-diethylphosphorochloridothioate, and 3.4 parts of sodium acetate in 25 parts of benzene and 15 parts of water is stirred vigorously at 40° C.–50° C. for three hours. The temperature is allowed to rise to 60° C.–65° C. and stirring is continued for an additional two hours. The benzene phase is separated and the water phase is extracted once with ether. The total organic phase is washed with water, dilute hydrochloric acid, dilute sodium carbonate solution, and dried in the usual way. Removal of solvent leaves 4.9 parts of oil contaminated with starting chloridothioate. Molecular distillation at 100° C./3–5μ yields 0.89 part or 16.5% of theory of product having a refractive index ($n_D^{25}$) equal to 1.600 and showing a strong band in the infrared absorption spectrum at 1530 cm.$^{-1}$ attributable to the >C=N— function.

Analysis for $C_8H_{16}NO_2PS_3$—Calculated: C, 33.67; H, 5.65. Found: C, 34.27; H, 5.55.

EXAMPLE 28

*Preparation of 2-dimethoxyphosphinothioylimino-1,3-dithiane*

Following the procedure of Example 27 in every detail, except that O,O-dimethylphosphorochloridothioate is employed instead of the O,O-diethylphosphorochloridothioate reactant, resultant 2-dimethoxyphosphinothioylimino-1,3-dithiane is recovered in good yield having a refractive index ($n_D^{25}$) equal to 1.6248 and analyzing as follows—

Calculated: C, 28.00; H, 4.70; N, 5.44; P, 12.04; S, 37.38. Found: C, 27.73; H, 5.77; N, 5.25; P, 11.70; S, 37.08.

EXAMPLE 29

*Preparation of 2-diethoxyphosphinylimino-1,3-dithiolane*

To a mixture of 6.0 parts of O,O-diethylphosphorochloridate and 4.7 parts of 2-imino-1,3-dithiolane hydrochloride in 75 parts of dry acetone are added over fifteen minutes 6.1 parts of triethylamine. The reaction temperature is maintained below 35° C. by external cooling. After three hours, 7.9 parts of triethylamine hydrochloride are collected. Acetone is then removed from the filtrate under vacuum and the 7.6 parts of residual oil are purified by molecular distillation at .001 mm. Hg between 100° C.–105° C. giving a 64% yield of pure product having a refractive index ($n_D^{25}$) equal to 1.5463.

Analysis for $C_7H_{14}NO_3PS_2$—Calculated: C, 32.93; H, 5.53; N, 5.49; P, 12.14; S, 25.13. Found: C, 32.84; H, 5.49; N, 5.48; P, 12.32; S, 25.32.

EXAMPLE 30

*Preparation of 2-diethoxyphosphinylimino-4-o-chlorophenyl-1,3-dithiolane*

The procedure of Example 29 is repeated in every detail, except that for the 2-imino-1,3-dithiolane hydrochloride is substituted 2-imino-4-o-chlorophenyl-1,3-dithiolane hydrochloride. The resultant oily product, 2-diethoxyphosphinylimino-4-o-chlorophenyl - 1,3 - dithiolane, shows a strong >C=N— band at 1560 cm.$^{-1}$ by means of infrared analysis.

EXAMPLE 31

*Preparation of 2-diethoxyphosphinylimino-4-methyl-1,3-dithiolane*

Repeating the procedure of Example 29 in every detail, except that 2-imino-4-methyl-1,3-dithiolane hydrochloride is employed in lieu of the 2-imino-1,3-dithiolane reactant therein, a good yield of 2-diethoxyphosphinylimino-4-methyl-1,3-dithiolane is obtained. The product possesses a refractive index ($n_D^{25}$) equal to 1.5354 and analyzes as—

Calculated: C, 35.67; H, 5.99; N, 5.20; P, 11.50; S, 23.81. Found: C, 35.91; H, 6.09; N, 5.11; P, 11.73; S, 23.72.

EXAMPLE 32

*Preparation of 2-diisopropoxyphosphinothioylimino-1,3-dithiolane*

To a mixture of 32.5 parts of O,O-diisopropylphosphorochloridothioate and 26.5 parts of sodium bicarbonate in 25 parts of benzene and 50 parts of water are added 23.3 parts of 2-imino-1,3-dithiolane hydrochloride in 25 parts of water. After heating the mixture at 40° C. for four hours, the organic layer is separated and washed successively with dilute sodium hydroxide, dilute hydrochloric acid, water and saturated salt solution. Vacuum stripping leaves 43 parts of crude product, or 85% of theory, which is reduced to 27.5 parts by low temperature recrystallization from an ether-hexane mixture. The product melts at about 10° C.

Analysis for $C_9H_{18}NO_2PS_3$—Calculated: C, 36.10; H, 6.06; N, 4.68; P, 10.35; S, 32.13. Found: C, 35.88; H, 5.69; N, 5.09; P, 10.64; S, 32.63.

EXAMPLE 33

*Preparation of 2-di-n-propyloxyphosphinothioylimino-1,3-dithiolane*

Following the procedure of Example 32 in every detail, except that O,O-di-n-propylphosphorochloridothioate is employed instead of O,O-diisopropylphosphorochloridothioate, the product, 2-di-n-propyloxyphosphinothioyl-imino-1,3-dithiolane, is recovered in good yield having a refractive index ($n_D^{25}$) equal to 1.5783.

Analysis for $C_9H_{18}NO_2PS_3$—Calculated: C, 36.10; H, 6.06; N, 4.68; P, 10.35; S, 32.13. Found: C, 36.11; H, 6.23; N, 4.93; P, 10.38; S, 32.19.

EXAMPLE 34

*Preparation of 2-diethoxyphosphinothioylimino-4-methyl-1,3-dithiolane*

To a mixture of 10.6 parts of sodium bicarbonate and 11.2 parts of O,O-diethylphosphorochloridothioate in 20 parts of water and 10 parts of benzene are added over fifteen minutes 10.2 parts of 2-imino-4-methyl-1,3-dithiolane hydrochloride in 10 parts of water. After mixing for nineteen hours at room temperature, the reaction mixture is extracted several times with benzene. The combined benzene layers, after washing, drying and stripping in the usual manner, leave 15.2 parts of yellow oil. Molecular distillation at 114° C.–116° C./.001 mm. Hg yields 9.7 parts of pure product having a refractive index ($n_D^{25}$) equal to 1.5814.

EXAMPLE 35

*Preparation of 2-ethoxyethylphosphinothioylimino-1,3-dithiolane*

To a mixture of 3.8 parts of O-ethyl ethylphosphonochloridothioate and 4.1 parts of sodium bicarbonate in 20 parts of water and 20 parts of benzene are added 3.7 parts of 2-imino-1,3-dithiolane hydrochloride in 10 parts of water over a ten minute period. After stirring at room temperature for thirty minutes, the mixture is heated at about 35° C. for two to three hours. The aqueous phase is separated, washed with benzene, and the combined benzene layers are washed successively with 5% potassium hydroxide, 5% hydrochloric acid, and saturated salt solution. Drying over magnesium sulfate followed by stripping off solvent under vacuum leaves a viscous oil residue. Molecular distillation of the oil yields 3.4 parts of product as a colorless oil having a refractive index ($n_D^{25}$) equal to 1.6155.

Analysis for $C_7H_{14}NOPS_3$—Calculated: C, 32.91; H, 5.52; N, 5.48; P, 12.13; S, 37.66. Found: C, 32.98; H, 5.48; N, 5.49; P, 12.33; S, 37.68.

EXAMPLE 36

*Preparation of 2-ethoxydimethylaminophosphinothioylimino-1,3-dithiolane*

To a mixture consisting of 18.8 parts of N,N-dimethyl-O-ethyl-phosphoramidochloridothioate and 18.5 parts of sodium bicarbonate in 50 parts of water and 50 parts of benzene are slowly added 17.1 parts of 2-imino-1,3-dithiolane hydrochloride in 50 parts of water. The mixture is then stirred for about one day. The benzene phase is next separated and the water phase is extracted with fresh benzene. The combined benzene layers are washed with 5% hydrochloric acid, 5% potassium hydroxide, and with saturated salt solution, successively. After drying over magnesium sulfate, the mixture is stripped of solvent under vacuum to give 18.5 parts of a viscous oil. Molecular distillation of 10.0 parts of this oil affords 4.1 parts of product which crystallizes and, after recrystallization from isopropyl alcohol, melts at 50° C.–51° C.

Analysis for $C_7H_{15}N_2OPS_3$—Calculated: C, 31.09; H, 5.59; N, 10.36; P, 11.46; S, 35.57. Found: C, 31.18; H, 5.68; N, 10.32; P, 11.57; S, 35.87.

EXAMPLE 37

*Preparation of 2-(ethoxydimethylaminophosphinothioylimino)-4-p-chlorophenyl-1,3-dithiolane*

Following the procedure of Example 36 in every detail, except that for the dithiolane hydrochloride reactant 2-imino-4-p-chlorophenyl-1,3-dithiolane hydrochloride is subsituted, the resultant low-melting solid, 2-(ethoxydimethylaminophosphinothioylimino) - 4 - p - chlorophenyl-1,3-dithiolane, shows a strong >N=C— band at 1565 cm.$^{-1}$ by means of infrared spectrum analysis.

EXAMPLE 38

*Preparation of 2-ethoxyphenylphosphinothioylimino-1,3-dithiolane*

To a mixture of 22.1 parts of 87% O-ethyl phenylphosphorochloridothioate and 16.8 parts of sodium bicarbonate in 100 parts of water and 100 parts of benzene are added 15.6 parts of 2-imino-1,3-dithiolane hydrochloride in 125 parts of water over a ten minute period. After an additional ten minutes, the mixture is heated at 40° C. for one hour and is then allowed to stand overnight at room temperature. The aqueous phase is separated, washed with benzene, and the combined benzene layers are washed with 5% potassium hydroxide, 5% hydrochloric acid and saturated salt solution, successively. After drying over magnesium sulfate, the solvent is removed under vacuum. The residual oil is dissolved in 100 parts of acetone, and the mixture is cooled to minus (—) 15° C. to separate a solid by-product. Removal of the acetone leaves an oil which crystallizes on triturating with methanol. Repeated recrystallization from ethanol gives 8.5 parts of white crystalline product. The melting point of 63° C.–68° C. is unchanged by further recrystallizations.

Analysis for $C_{11}H_{14}NOPS_3$—Calculated: C, 43.54; H, 4.65; N, 4.62; P, 10.19; S, 31.70. Found: C, 43.65; H, 4.69; N, 4.80; P, 10.27; S, 31.70.

EXAMPLE 39

*Preparation of 2-diethoxyphosphinothioylimino-4-phenyl-1,3-dithiolane*

To a slurry of 13.9 parts of 2-imino-4-phenyl-1,3-dithiolane hydrochloride in 20 parts of water are slowly added 10.6 parts of sodium bicarbonate. After adding 11.2 parts of O,O-diethylphosphorochloridothioate in 10 parts of benzene, the reaction mixture is stirred for seventeen hours at room temperature. The benzene phase is separated and the aqueous phase extracted with additional benzene. The combined benzene layers, after washing, drying and stripping in the usual manner, leave 19.8 parts of crude product. Molecular distillation at 147° C.–150° C. at .001 mm. Hg pressure gives 14.7 parts of pure product, having a refractive index ($n_D^{25}$) equal to 1.6202, whose analysis for $C_{13}H_{18}NO_2PS_3$ is as follows—

Calculated: C, 44.92; H, 5.22; N, 4.03; P, 8.91; S, 27.67. Found: C, 44.76; H, 5.09; N, 4.11; P, 8.96; S, 27.82.

EXAMPLE 40

*Preparation of 2-diethoxyphosphinothioylimino-4-p-chlorophenyl-1,3-dithiolane*

Following the procedure of Example 39 in every detail, except that 2-imino-4-chlorophenyl-1,3-dithiolane hydrochloride is reacted instead of 2-imino-1,3-dithiolane hydrochloride, the resultant oily product, 2-diethoxyphosphinothioylimino-4-p-chlorophenyl - 1,3 - dithiolane, obtained in good yield, shows an infrared absorption spectrum having a strong >C=N— band at 1560 cm.$^{-1}$.

EXAMPLE 41

*Preparation of 2-diethoxyphosphinothioylimino-4-p-sulfamylphenyl-1,3-dithiolane*

Following the procedure of Example 39 in every detail, except that for the 2-imino-1,3-dithiolane hydrochloride reactant 2-imino-4-p-sulfamylphenyl-1,3-dithiolane hydrochloride is substituted, resultant low-melting solid, 2-diethoxyphosphinothioylimino-4-p-sulfamylphenyl - 1,3-dithiolane, shows an infrared absorption spectrum having a strong >C=N— band at 1555 cm.$^{-1}$.

EXAMPLE 42

*Preparation of 2-diethoxyphosphinothioylimino-4-m-carbethoxyphenyl-1,3-dithiolane*

Following the procedure of Example 39 in every detail, except that for the 2-imino-1,3-dithiolane hydrochloride, 2-imino-4-m-carbethoxyphenyl-1,3-dithiolane hydrochloride is substituted, resultant oily product, 2-diethoxyphosphinothioylimino - 4 - m - carbethoxyphenyl-1,3-dithiolane, shows an infrared absorption spectrum having a strong >C=N— band at 1550 cm.$^{-1}$.

EXAMPLE 43

*Preparation of 2-diethoxyphosphinylimino-4-p-nitrophenyl-1,3-dithiolane*

The procedure of Example 29 is followed in every detail, except that for the 2-imino-1,3-dithiolane hydrochloride reactant of that example, 2-imino-4-p-nitrophenyl-1,3-dithiolane hydrochloride is substituted. Resultant oily product, 2-diethoxyphosphinylimino-4-p-nitrophenyl - 1,3-dithiolane, is recovered in good yield having an infrared absorption spectrum showing a strong >C=N— band at 1552 cm.$^{-1}$.

EXAMPLE 44

*Preparation of 2-diisopropyloxyphosphinylimino-5-m-methoxyphenyl-1,3-oxathiolane*

Following the procedure of Example 29 in every detail, except that for the 2-imino-1,3-dithiolane reactant of that example, 2-imino-5-m-methoxyphenyl - 1,3 - oxathiolane hydrochloride is substituted and for the O,O-diethylphosphorochloridate, O,O - diisopropylphosphorochloridate is substituted, an oily product, 2-diisopropyloxyphosphinylimino-5-m-methoxyphenyl - 1,3 - oxathiolane, is recovered having an infrared absorption spectrum showing at strong >C=N— band at 1545 cm.$^{-1}$.

EXAMPLE 45

*Preparation of 2-dimethoxyphosphinylimino-4-phenyl-1,3-dithiolane*

To a mixture of 8.0 parts of 2-imino-4-phenyl-1,3-dithiolane hydrochloride and 5.2 parts of O,O-dimethylphosphorochloridate in 50 parts of dry ether are added over a period of one hour 10.1 parts of triethyl amine. After refluxing the mixture overnight, the ether is decanted, the remaining solids washed with ethyl acetate, and the ether-ethyl-acetate mixture is concentrated to yield 10.7 parts of crude product as an oil. The oil is remixed with methylene chloride and the mixture is washed successively with water, 5% hydrochloric acid, 5% sodium hydroxide, water and twice with saturated salt solution. Stripping off solvent leaves 8.3 parts, or 73% of theory of product, identified by infra-red absorption spectrum and having a refractive index ($n_D^{25}$) equal to 1.6048.

Analysis for $C_{11}H_{14}NO_3PS_2$—Calculated: C, 43.55; H, 4.65; P, 10.21; S, 21.14. Found: C, 43.52; H, 4.85; P, 10.05; S, 21.01.

EXAMPLE 46

*Preparation of 2-diisopropylphosphinylimino-4-m-methylthiophenyl-1,3-dithiolane*

Following the procedure of Example 45 in every detail, except that for the dithiolane reactant 2-imino-4-m-methylthiophenyl-1,3-dithiolane hydrochloride is substituted, and for O,O-dimethylphosphorochloridate, O,O-diisopropylphosphorochloridate is substituted, 2-diisopropylphosphinylimino - 4 - m - methylthiophenyl - 1,3 - dithiolane is obtained in good yield and possesses an infrared absorption spectrum having a strong >C=N— band at 1550 cm.$^{-1}$.

EXAMPLE 47

*Preparation of 2-ethoxymethylaminophosphinothioylimino-1,3-dithiolane*

A mixture of 17.2 parts of 2-imino-1,3-dithiolane in 50 parts of water is added over a ten minute period to a mixture of 17.4 parts of O-ethyl N-methylphosphoramidochloridothioate and 18.2 parts of sodium bicarbonate in 50 parts of water and 50 parts of benzene. After stirring the mixture for twenty hours, the organic phase is separated, washed and then dried. Distillation of the solvent and molecular distillation of the resultant oil at 140° C.–144° C. at .001 mm. Hg afford 7.7 parts or 30% of theory of pure product, having a refractive index ($n_D^{25}$) equal to 1.6269.

Analysis for $C_6H_{13}N_2OPS_3$—Calculated: C, 28.17; H, 5.11; N, 10.93; P, 17.09; S, 37.53. Found: C, 27.33; H, 5.26; N, 11.00; P, 17.23; S, 37.69.

EXAMPLE 48

*Preparation of 2-ethoxyethylphosphinylimino-1,3-dithiolane*

To a dry vigorously stirred mixture of 15.7 parts of O-ethyl ethylphosphonyl chloride and 15.6 parts of 2-imino-1,3-dithiolane hydrochloride in 200 parts of acetone are added 20.2 parts of triethylamine over a seven minute period. During the addition, the temperature is maintained at 25° C. by cooling the reaction flask in an ice bath. After stirring the mixture maintained at room temperature for three additional hours, the triethylamine hydrochloride is collected. Concentration of the filtrate leaves an oil which, when mixed with 100 parts of ether, precipitates additional triethylamine hydrochloride. The oil obtained by filtration of the ether mixture is concentrated and molecularly distilled at 100° C–106° C/.001 mm. Hg. The initial 11.9 parts of product are contaminated with triethylamine hydrochloride. Pure product amounting to 7.1 parts having a refractive index ($n_D^{25}$) equal to 1.5632 is then collected.

Analysis for $C_7H_{14}NO_2PS_2$—Calculated: C, 35.12; H, 5.90; N, 5.85; P, 12.94; S, 26.80. Found: C, 34.97; H, 6.02; N, 5.99; P, 13.06; S, 27.02.

EXAMPLE 49

*Preparation of 2-diethylphosphinothioyl-imino-1,3-dithiolane*

To a stirred mixture of 10.0 parts of diethylphosphinothioyl bromide, 7.8 parts of 2-imino-1,3-dithiolane hydrochloride and 200 parts of acetone are added 10.1 parts of triethylamine over a five minute period. The mildly exothermic reaction is maintained at 25° C. during the addition by external cooling. After stirring an additional four hours at room temperature, the mixture is filtered, the solvent is removed from the filtrate under reduced pressure, and the residual oil is partitioned between 150 parts of ether and 30 parts of water. The ether layer is washed successively with 5% hydrochloric acid, saturated salt solution, 5% potassium hydroxide and saturated salt solution and is next dried over magnesium sulfate. Concentration of the resulting mixture leaves 11.0 parts of viscous oil. Molecular distillation of the oil at 1 to 2µ affords several fractions of product. A yield of 4.5 parts of 2-diethylphosphinothioylimino-1,3-dithiolane, having a refractive index ($n_D^{25}$) equal to 1.6437, is obtained.

Analysis for $C_7H_{14}NPS_3$ — Calculated: C, 35.12; H, 5.89; N, 5.85; P, 12.94; S, 40.18. Found: C, 34.95; H, 5.88; N, 6.00; P, 13.12; S, 40.24.

EXAMPLE 50

*Preparation of 2-dimethoxyphosphinylimino-1,3-dithiane*

In a suitable reaction vessel, 25 parts of 2-imino-1,3-dithiane hydrochloride are dissolved in 40 parts of water and mixed with 100 parts of chloroform. Dry sodium bicarbonate (27.2 parts) is added in several portions, followed by dropwise addition of 23.4 parts of O,O-dimethyl phosphorochloridate during twenty minutes at ambient temperature. Stirring is continued for one hour until evolution of carbon dioxide gas ceases. The chloroform layer is separated and the water layer extracted with chloroform to complete the recovery of product. Removal of the solvent leaves 35.5 parts of yellow oil which is crystallized from methylene chloride and ether to give 22.2 parts of an hygroscopic crystalline product, 2-dimethoxyphosphinylimino-1,3-dithiane, having a melting point equal to 37.5° C.–38.5° C. and analyzing as follows—

Calculated: C, 29.87; H, 5.01; N, 5.80; P, 12.84; S, 26.58. Found: C, 29.92; H, 5.15; N, 5.84; P, 12.70; S, 26.24.

It is an advantage of the present invention that the compounds hereinabove defined can be utilized by incorporating them into a variety of inert insecticidal and nematocidal carriers or diluents. For instance, each of the compounds can be dissolved in an inert organic solvent, such as acetone, ethyl acetate, ethyl alcohol, benzene, xylene, kerosene or equivalents thereof; or the compounds may be admixed with an inert solid carrier, as for example, fuller's earth, precipitated hydrated silicon dioxide, activated carbon bentonite, attaclay, celite, kaolin clay, a mixture of bentonite and attapulgite, and the like. If desired, a suspension of the compounds may be prepared by employing a non-solvent therefor. In that event it is advantageous to add thereto any commercially available dispersing or surface-active agent of the anionic cationic or non-ionic types, or mixtures of the same. Illustrative surface-active agents are: the alkylaryl sulfonates, the calcium salt of an oil-soluble sulfonate and polyoxyethylene ethers, such as "Emcol H 140," the sodium salt of a polymerized propyl naphthalene sulfonic acid, formed by condensing formaldehyde with a propyl naphthalene sodium sulfonate, the alkylaryl polyether alcohols, the ethylene oxide addition products of such esters as for instance "Tween-20," and the like. Usually, from one to five parts of dispersing agent per one-hundred parts of a compound is a good operating range.

The quantity of inert solid or liquid carrier or diluent employed with respect to the insecticidal compounds can be widely varied. It has, however, been found that, depending upon the carrier employed, from about 1% to about 80%, and preferably from about 20% to 70% by weight of the compound, based on the weight of the inert carrier, is wholly satisfactory.

The rate of application of the over-all composition as applied to foilage, soil or seed can be widely varied. For instance, when applied to foliage, a convenient rate is found to be between 0.25 and two pounds of active compound per acre. As to soil application, for both insecticidal and nematocidal activity, a good operating rate is found to be between one and ten pounds of active compound per acre. Finally, seeds can effectively be treated at a rate between about one to eight pounds by weight of the compound per one-hundred pounds of seed.

To illustrate the systemic insecticidal activity of the O,O-dialkoxyphosphinyl imides of the present invention, the following examples are presented.

EXAMPLE 51

A mixture consisting of 47 parts of 2-diethoxy-phosphinothioylimino-1,3-dithiolane, 48 parts of xylene and 5 parts of a mixture of the calcium salt of an oil-soluble sulfonate and polyoxyethylene ethers, is prepared. 2.13 parts (by volume) of the resultant mixture are then diluted to 1000 parts with water to form an emulsion.

The primary leaves of young sieva lima bean plants are dipped for about ten seconds in the above emulsion. The plants are air-dried and placed in a ventilated box which exposes only the untreated trifoliate leaves and which prevents any fumes from reaching the trifoliate leaves.

About one-hundred adult two-spotted spider mites (*Tetranychus telarius*) are transferred from a stock culture to the untreated trifoliate leaves. The plants are held at 80° F. and watered daily. Mortality counts are made forty-eight hours after infestation.

It is observed that a minimum of six days is required to obtain maximum plant systemic activity on untreated trifoliate leaves when the prepared emulsion containing the afore-mentioned 1,3-dithiolane is applied to the primary leaves. A mortality rate of 83 percent is recorded at the end of the sixth day. The data also indicate the over-all compositionh as long residual, systemic properties by retaining its maximum activity for at least eighteen days, while maintaining a mortality rate or percent kill of 83 percent.

EXAMPLE 52

The above experiment for systemic activity of the above-defined emulsion is repeated, except that the following active compounds are individually substituted for the diethoxy dithiolane compound with similar beneficial results:

2-diethoxyphosphinothioylimino-1,3-dithiolane,
2-dimethoxyphosphinothioylimino-1,3-dithiolane,
2-dimethoxyphosphinothioylimino-4-methyl-1,3-dithiolane,
2-dimethoxyphosphinylimino-1,3-dithiolane,
2-diethoxyphosphinylimino-1,3-dithiolane.

EXAMPLE 53

This example illustrates the long-lasting systemic activity against chewing insects:

An emulsifiable concentrate is prepared according to Example 51. This concentrate is then diluted with water and sprayed at the rate of one pound of active compound per acre to young lima bean plants. The new untreated trifoliate leaves are protected for at least six weeks against the Southern armyworm (*Prodenia eridania* C.) and other leaf feeding lepidopterous insects.

EXAMPLE 54

Granular compositions for use in the soil are readily prepared by separately impregnating each of the imides of Examples 51 and 52 on a 30–60 mesh attaclay at a concentration of 10% of the final weight of each of the compositions. The impregnation is carried out by spraying the active compound dissolved in methylene chloride on the attaclay carrier while the latter is being agitated.

In greenhouse tests, the 10% granular composition is mixed with soil to provide desired active compound at a rate of two pounds per acre. The soil is placed in two crocks and lima beans are planted in each. At various intervals after plant emergence, the plants are infested with two-spotted mites in one crock and Southern armyworms are added to the other. After seevnty-two hours, 80 percent kill in each crock is observed. This level of effectiveness is noted even after twenty-seven days of testing.

EXAMPLE 55

Wettable powder formulations are prepared separately utilizing the imides of Examples 51 and 52 at a concentration of 25 percent with kaolin clay.

The wettable powder is employed as in Example 53 above with similar results.

EXAMPLES 56

Seed coating compositions are prepared utilizing separately O,O - dimethoxyphosphinothioylimino -(1,3-dithiolane and O,O-diethoxyphosphinothioylimino-1,3-dithiolane in precipitated hydrated silicon dioxide at a concentration of 80 percent of the final preparation. Each of the compositions is prepared by blending or grinding the corresponding imide with the diuent to produce a finely divided preparation which is employed to coat seeds. It is applied directly to cotton seeds. These are treated with the above-defined prepartion at a rate of 4 percent of the active imide based on the weight of the seed.

The seeds are planted in crocks and the plants growing from the seeds are tested at intervals using the boll weevil. The data obtained are recorded in Table I below:

TABLE I

| Compound—phosphinothioylimino-1,3-dithiolane | Percent Kill Weeks After Plant Emergence | | | | |
|---|---|---|---|---|---|
| | 7 | 8 | 9 | 10 | 11 |
| O,O-diethoxy | 100 | 100 | 100 | 100 | 96 |
| O,O-dimethoxy | 100 | 98 | 92 | 86 | 74 |

In addition, these plants obtained from the treated seeds give 100 percent kill of two-spotted spider mites and cotton aphids for at least four weeks after plant emergence.

EXAMPLES 57 to 70

The nematocidal activity exhibited by the compounds of the present invention is clearly demonstrated by the following test, wherein measured amounts of the compounds to be tested are dissolved in a liquid carrier and admixed with a measured quantity of soil. The measured amounts of the several compounds in test are equivalent to 25, 10, 5, 2.5 and 1.25 pounds of active ingredient per acre. Control treatments omitting active ingredient are run simultaneously to provide comparative results. After mixing, pint cups are filled with about one inch of treated soil and an aqueous suspension of the root-knot nematode (Meloidgyne species), comprising adults, eggs and larvae, is added to the soil. An additional one inch of soil is added to each cup and the cups are placed in the greenhouse for seven days to permit propagation or kill of the nematodes, depending on the effect of the compound in test. During the standing period, the cups are cared for as if they contained living plants. Following this propagation period, a tomato seedling is planted in each cup and the plants are cared for in the usual manner for twenty-one days until the test is terminated. Twenty-one days after planting, the tomato plants are removed and examined for root-knot nematode gall development. All controls shows severe galling. On comparison with the controls, the compounds of the present invention are found to be exceedingly effective nematocides as demonstrated by the results provided in Table II below.

TABLE II

| Ex. | Test Compound | Applied Nematode Screening Test, Percent Reduction in Root-Knot Nematode Galling | | | | |
|---|---|---|---|---|---|---|
| | | Pounds per Acre | | | | |
| | | 25 | 10 | 5 | 2.5 | 1.25 |
| 57 | [S,S-ring]=N—P(S)(OCH$_3$)$_2$ | 100 | 100 | 100 | 90 | 0 |
| 58 | [S,S-ring]=N—P(S)(OC$_2$H$_5$)$_2$ | 100 | 100 | 90 | 0 | -------- |
| 59 | [S,S-ring]=N—P(O)(OC$_2$H$_5$)$_2$ | 100 | 100 | 100 | 50 | -------- |
| 60 | (C$_2$H$_5$O)$_2$P(S)—N=[S,S-ring-CH$_3$] | 100 | 100 | 90 | 0 | -------- |
| 61 | [S,S-ring]=N—P(O)(OCH$_3$)$_2$ | 100 | 100 | 90 | 0 | -------- |
| 62 | C$_2$H$_5$O—P(S)(CH$_3$O)—N=[S,S-ring] | 100 | 100 | 90 | 90 | 0 |
| 63 | (CH$_3$O)$_2$P(S)—N=[S,S-ring-CH$_3$] | 100 | 100 | 90 | 90 | 0 |
| 64 | (C$_2$H$_5$O)$_2$P(S)—N=[S,S-ring-(CH$_3$)$_2$] | 100 | 100 | 90 | 0 | -------- |
| 65 | (CH$_3$O)$_2$P(S)—N=[S,S-ring] | 100 | 0 | -------- | -------- | -------- |

TABLE II—Continued

| Ex. | Test Compound | Applied Nematode Screening Test, Percent Reduction in Root-Knot Nematode Galling Pounds per Acre | | | | |
|---|---|---|---|---|---|---|
| | | 25 | 10 | 5 | 2.5 | 1.25 |
| 66 | (C₂H₅O)₂P(=O)—N=⟨1,3-dithiolane-4-CH₃⟩ | 100 | 100 | 100 | 90 | 0 |
| 67 | (C₂H₅O)₂P(=O)—N=⟨1,3-dithiane⟩ | 100 | 100 | 90 | | |
| 68 | (CH₃O)₂P(=O)—N=⟨1,3-dithiane⟩ | 100 | 100 | 100 | 100 | 90 |
| 69 | (CH₃O)₂P(=S)—N=⟨1,3-oxathiolane⟩ | 100 | 50 | | | |
| 70 | (CH₃O)₂P(=O)—N=⟨1,3-dithiolane⟩ | 100 | 100 | 100 | 90 | |

I claim:

1. A method for protecting a plant from insect attack which comprises: spraying on said plant a long-lasting systemic composition comprising an inert carrier and an effective amount of an imide having the formula:

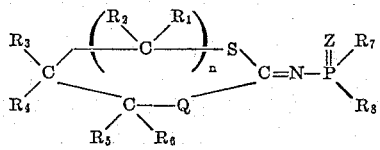

wherein $R_1$, $R_2$, $R_3$, $R_4$, $R_5$ and $R_6$ are each a substituent selected from the group consisting of hydrogen, lower alkyl, lower carbalkoxy, halo-lower alkyl, phenyl, lower alkyl substituted phenyl, nitrophenyl, halophenyl, cyanophenyl, methoxyphenyl, sulfamylphenyl, methylthiophenyl, lower carbalkoxyphenyl, carbamylphenyl, N-methylcarbamylphenyl, benzyl and naphthyl; $R_7$ and $R_8$ are each a substituent selected from the class consisting of lower alkyl, phenyl, lower alkoxy, lower monoalkylamino and lower dialkylamino; Q and Z are each selected from the group consisting of oxygen and sulfur; and $n$ is an integer from 0 to 1, whereby the said imide is absorbed by the plant, thereby rendering it toxic to insects attempting to feed on said plant over a prolonged period of time.

2. The method according to claim 1, wherein the imide compound is: 2-diethoxyphosphinothioylimino-1,3-dithiolane.

3. The method according to claim 1, wherein the imide compound is: 2-dimethoxyphosphinothioylimino-4-methyl-1,3-dithiolane.

4. The method according to claim 1, wherein the imide compound is: 2-diethoxyphosphinothioylimino-4-methyl-1,3-dithiolane.

5. The method according to claim 1, wherein the imide compound is: 2-dimethoxyphosphinothioylimino-1,3-dithiolane.

6. The method according to claim 1, wherein the imide compound is: 2-dimethoxyphosphinothioylimino-1,3-oxathiolane.

7. The method according to claim 1, wherein the imide compound is: 2-diethoxyphosphinothioylimino-1,3-dithiane.

8. The method according to claim 1, wherein the imide compound is: 2-diethoxyphosphinylimino-1,3-dithiolane.

9. The method according to claim 1, wherein the imide compound is: 2-dimethoxyphosphinylimino-1,3-dithiane.

10. The method according to claim 1, wherein the imide compound is: 2-dimethoxyphosphinylimino-4-methyl-1,3-dithiolane.

11. The method according to claim 1, wherein the imide compound is: 2-diethoxyphosphinylimino-4-methyl-1,3-dithiolane.

12. A method for protecting a plant from insect and nematode attack which comprises: applying to said plant in the area of its roots a long-lasting systemic composition comprising an inert carrier and an effective amount of a phosphinyl imide as defined in claim 1, whereby said imide is absorbed by the plant, thereby rendering it toxic to insects and nematodes attempting to feed on said plant over a prolonged period of time.

13. A method for protecting a plant from insect and nematode attack which comprises: applying to the seed of the plant a long-lasting systemic composition comprising an inert carrier and an effective amount of a phosphinyl imide as defined in claim 1, whereby the said imide is absorbed by the plant, thereby rendering it toxic to insects and nematodes attempting to feed on said plant over a prolonged period of time.

No references cited.

JULIAN S. LEVITT, *Primary Examiner.*

UNITED STATES PATENT OFFICE
CERTIFICATE OF CORRECTION

Patent No. 3,197,365            July 27, 1965

James Byron Lovell

It is hereby certified that error appears in the above numbered patent requiring correction and that the said Letters Patent should read as corrected below.

Column 1, lines 22 to 25, and column 2, lines 11 to 16, for that portion of the formula, each occurrence, reading

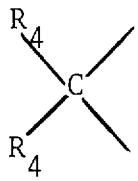      read      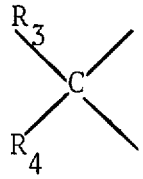

column 1, line 40, for "foilage" read -- foliage --; column 4, line 55, for "2-imino-1,3-diethiolane" read -- 2-imino-1,3-dithiolane --; column 5, line 11, for "contined" read -- continued --; line 50, for "95° C.-100° C./0.005 mm. Hg" read -- 95° C.-100° C./0.05 mm. Hg --; column 7, line 10, for "petroluem" read -- petroleum --; line 24, for "product." read -- product, --; column 15, line 40, for "of a compound" read -- of compound --; line 50, for "foilage" read -- foliage --; column 16, line 12, for "compositionh as" read -- composition has --; line 55, for "seevnty-two" read -- seventy-two --; line 65, for "EXAMPLES" read -- EXAMPLE --; line 73, for "diuent" read -- diluent --; column 17, Table I, last column, line 3 thereof, for "74" read -- 84 --.

Signed and sealed this 18th day of January 1966.

(SEAL)
Attest:

ERNEST W. SWIDER            EDWARD J. BRENNER
Attesting Officer            Commissioner of Patents